May 27, 1958 D. E. KEY 2,836,018
MANUFACTURING DEVICE
Filed Sept. 25, 1956
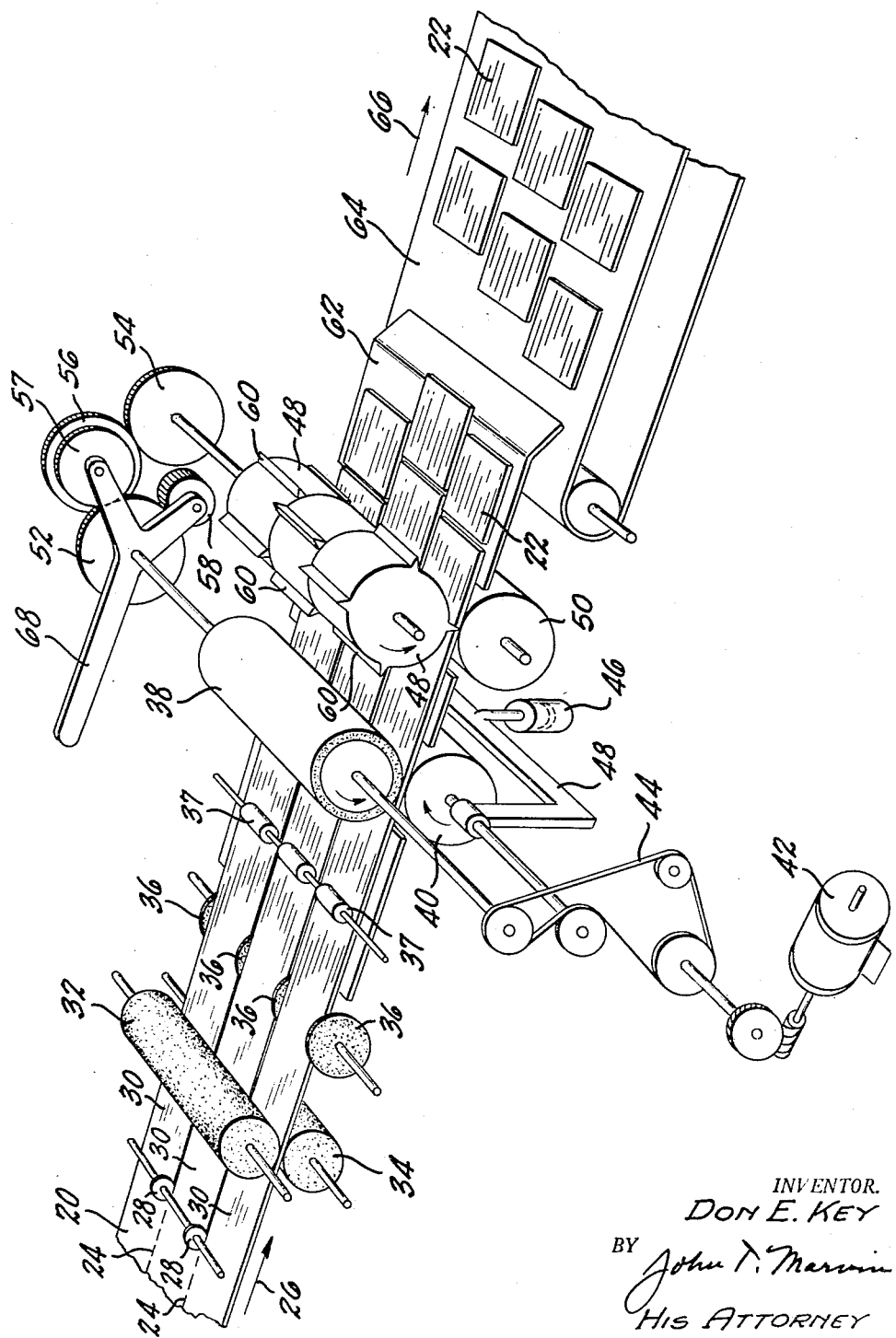
INVENTOR.
DON E. KEY
BY John T. Marvin
HIS ATTORNEY

United States Patent Office 2,836,018
Patented May 27, 1958

2,836,018

MANUFACTURING DEVICE

Don E. Key, Anderson, Ind., assignor to General Motors Corporation, Detroit, Mich., a corporation of Delaware Application September 25, 1956, Serial No. 611,841

5 Claims. (Cl. 51—281)

This invention relates to a method and apparatus for manufacturing storage battery separators and is more particularly concerned with a method and apparatus for forming individual hard rubber separators from a strip of cured rubber material.

In the manufacture of hard rubber separators as used in present day storage batteries, the materials for the separator are first compounded and then formed into strips of considerable length which are wound into a roll before curing. These rolls usually have a width several times the width of the separators which are to be cut therefrom. The wide strip is usually provided with longitudinally extending weakened portions which are spaced traversely across the strip to facilitate the division of the wide strip into individual strips each having a width substantially equal to the width of the individual separators.

The separators used in present day batteries are usually provided with a smooth surface on one side and a corrugated or embossed surface on the other side. This corrugated or embossed surface is formed during manufacture in the wide strip prior to the curing step. It is to be appreciated that a large number of separators are used in each battery that is manufactured. Thus, it is necessary if high battery production is to be achieved, that the individual separators be rapidly and economically formed to exact dimensions. The apparatus and method of the present invention are directed to realizing this objective for the apparatus according to the present invention is able to accommodate one hundred or more linear feet per minute of moving strip material without difficulty.

It is an object therefore of the present invention to divide a moving strip of relatively brittle hard rubber material into individual pieces of predetermined dimension.

Another object of the present invention is to provide an apparatus which will divide a continuously moving strip of brittle hard rubber battery separator material into longitudinal strips, to size the divided strips by grinding the edges and surfaces thereof and to push the strip by means of revolving rolls between a cutting roll that is driven at a predetermined speed and a roll that is freely rotatable so that individual separators of each having a predetermined length will be severed from the moving strips.

A still further object is to form hard rubber battery separators from a continuously moving strip of relatively brittle material wherein the strip has a width equal to a multiple of the width of the separators to be formed therefrom by an apparatus which will slit the wide strips into individual strips each having a width substantially equal to a separator width, size the strip both as to thickness and width to predetermined separator dimensions, push the moving strips between an idler backing roll and a roll with cutting means thereon which is driven at a predetermined speed relative to the rolls which cause the pushing action to sever the strips into individual pieces of predetermined length and to convey the cut pieces away from the rolls which cut the strip material.

In carrying out the above objects it is another object of the present invention to provide a means for varying the speed of rotation between the pusher rolls and the driven roll which has the cutting means thereon for varying the length of the pieces which are cut from the moving strip.

It is still another object of the present invention to process a continuously moving strip of relatively brittle hard rubber separator material which has a smooth surface on one side and an embossed or corrugated surface on the other side and to sever the strip into individual strips which have substantially the same width as the separator to be formed and to size the strip both as to thickness and width before the individual strips are severed into separator lengths by a pair of rolls which have the strip fed thereto by a pair of rolls which are driven at a predetermined speed relative to only one of the rolls which perform the severing operation.

Further objects and advantages of the present invention will be apparent from the following description, reference being had to the accompanying drawings wherein a preferred embodiment of the present invention is clearly shown.

In the drawings; the single figure diagrammatically in perspective shows an apparatus for sizing and dividing a continuously moving strip of relatively brittle hard rubber separator material.

In the drawing the wide uncut strip 20 of cured hard rubber separator material is continuously presented to the apparatus diagrammatically shown from a source, not shown. The strip 20, is relatively brittle in nature and is formed to have a relatively smooth surface on one side and an embossed or corrugated surface on the opposite side. In the embodiment shown, the upper surface of the strip 30 is provided with longitudinally extending corrugations. The strip 20 is formed to have a width which is some multiple of the separators which are to be formed as for example the strip 20 has a width three times the width of the separators 22, and includes weakened portions 24. These weakened portions 24 extend longitudinally over the entire length of the strip and divide the strip 20 into 3 segments each of which is slightly larger than the width of a separator 22.

The strip 20 is initially fed in the direction of arrow 26 to the slitters 28 which are transversely spaced to engage the weakened portions 24 and divide the strip 20 into three segments 30 each having a width slightly greater than the width of the separators 22. The slitters 28 may either be rollers, as shown, or knives which will cause the strip 20 to be divided into equal strips 30.

After the strip 20 is divided, the individual segments 30 are fed between the grinding wheels 32 and 34. These wheels 32 and 34 are rotated by a suitable means, not shown, and are used to grind the strips 30 to a predetermined thickness. In the embodiment shown, the strips 30 are disposed so the corrugated surface is on top and engages wheel 32. The smooth surface of the strip 30 is located to be engaged by the wheel 34. Manifestly, if desired, only one surface of the strip need be ground during the sizing operation. For example, roll 34 may have a non-abrading surface in contact with the smooth surface of strip 30 while the abrading surface on wheel 32 contacts and removes the top portions of the ridges which form the corrugated surface of strip 30.

After the strips 30 are sized to the correct thickness they are passed between the revolving abrading discs 36 which are also driven by a suitable means, not shown. The discs 36 are transversely spaced and arranged to grind the edges on both sides of the strips 30 so each of the strips will have the width of the separators 22.

After the strips 30 are sized by the discs 36 they are guided by suitable means as rollers 37, and passed between rollers 38 and 40. These rollers are rotated in synchronism by the motor 42 and are driven by means 44 which may consist of a pulley and belt arrangement or a chain and sprocket combination so the rotation of rolls 38 and 40 will be equal. The roll 40 is provided with a smooth metallic outer surface that engages the smooth surface of strip 30. The roll 38 is provided with an outer surface of a suitable elastomeric material which engages the corrugated surface of the strip 30.

The elastomeric surface may be of any of the well-known rubbery material such as natural or synthetic rubbers, combinations thereof, or any similar materials which will engage and conform to the corrugated surface of strip 30 without deforming the strip 30. The rolls 38 and 40 are vertically disposed one above one another and are pressed together to tightly engage both sides of the strip. While any suitable means may be used to cause the pressure between the rolls 38 and 40, in the embodiment shown an air cylinder 46 is used to impart an upward force through yoke 48 on the roll 40.

The rolls 38 and 40 are used to drive or feed the strip 30 between rolls 48 and 50. The roll 50 is provided with a smooth outer metallic surface which engages the smooth under surface of strip 30. The roll 50 is freely rotatable and is rotated by the moving strip 30. The roll 48 on the other hand is rotated in synchronism at a predetermined speed ratio relative to rolls 38 and 40 by means of gears 52 and 54 and either of the gears 56 and 57 or gear 58 as will be later described.

The roll 48 is provided with circumferentially spaced cutters 60 thereon. These cutters may be made detachable if desired and are arranged so a slight clearance is present between the edges of the cutters 60 and the outer surface of roll 50. Thus, as the strip material passes between the rolls 48 and 50, the cutters 60 will be moved into position and sever the strip 30 into pieces or separators 22 each of which will have a predetermined length. As stated, the cutters 60 are in a clearance relation with the surface of roll 50. Thus, as the cutters 60 are rotated into the strip 30 they will initially bite into the strip and then cause the remaining portion of the brittle strip material to snap or break off the strip length. As can be clearly seen on the drawing the cutter blades 60 are staggered in their location on the roll or drum 48. Thus, the various parallel strips 30 will be severed at different intervals. When this arrangement is used the stress on the various parts of the apparatus is considerably reduced.

After the separators 22 are cut to the desired lengths by cutters 60 they are pushed on the guide 62 and fall on the belt conveyor 64 which moves in the direction of arrow 66. The conveyor 64 may be used to convey the separators to a drying oven if desired, and thence to a stacking device also not shown.

As clearly seen in the drawing a suitable means is provided to drive roll 48 at a synchronized speed relative to the rotational speeds of rolls 38 and 40. This means is capable of varying the relative speeds between the rollers so separators of different lengths may be severed from the strip 30. Thus, when handle 68 is in the position shown, gear 52 will drive gear 57 which in turn will drive gear 56. Gear 57 has a smaller diameter than gear 52 so gear 56 will rotate faster than gear 52. When this gear arrangement is used a short length separator will be separated from the strip 30. Where the handle 68 is moved downwardly the gears 57 and 56 will be moved from their driving engagement with gears 52 and 54 respectively and gear 58 will be brought into engagement therewith so that the gears 52 and 54 turn at the same rotational speed. This means roller 48 will rotate at the same speed as roller 38 or slower than when the roller is driven by gears 56 and 57. When this arrangement is used the separators of longer length will be served from the strip 30.

Further objects and advantages of the persent invention will be apparent from the following description, reference being had to the accompanying drawings wherein a preferred embodiment of the present invention is clearly shown.

What is claimed is as follows:

1. In a method for making battery plate separators from relatively brittle strip material of indeterminate length and of a breadth equal to at least two times the width of a single separator wherein said strip material is embossed on one side and is smooth on the other side, the steps comprising; pulling the strip material from a source of supply to move the strip at a constant rate of travel while simultaneously resiliently supporting the embossed side thereof, slitting the moving strip longitudinally into a plurality of individual strips each having a width equal to the width of a single separator, sizing the strip both as to width and thickness, pushing said slit strips into a rotating severing device for cutting said strip into a plurality of individual separators and conveying the individual separators from said separating device.

2. In a method for making battery plate separators from relatively brittle strip material of indeterminate length and of a breadth equal to at least two times the width of a single separator wherein said strip material is embossed on one side and is smooth on the other side, the steps comprising; pulling the strip material from a source of supply to move the strip at a constant rate of travel while simultaneously resiliently supporting the embossed side thereof, slitting the moving strip longitudinally into a plurality of individual strips each having a width equal to the width of a single separator, grinding the edges, and the smooth and embossed surfaces of each strip to size the strips to a predetermined width and thickness, pushing said slit strips into a rotating severing device for cutting said strip into a plurality of individual separators and conveying the individual separators from said separating device.

3. In a method for making battery plate separators from normally brittle strip material of indeterminate length and of a breadth equal to at least two times the width of a single separator wherein said strip has an embossed and a substantially smooth side, the steps comprising; pulling the strip material from a source of supply at a constant rate of travel while simultaneously resiliently supporting the embossed side thereof, slitting the moving strip longitudinally into a plurality of parallel individual strips each having a width equal to the width of a single separator, grinding the edges of said strip to size the strip to a predetermined width, pushing said strip into a rotating severing device having staggered cutting means thereon for severing said individual parallel strips transversely at staggered intervals from the embossed side thereof into a plurality of individual separators, and finally conveying said separators from the severing means.

4. An apparatus for severing storage battery separators from a plurality of continuously moving parallel strips of relatively brittle material wherein one side of said strips is substantially smooth and the other side is provided with a corrugated surface, comprising; a pair of vertically disposed rolls arranged for receiving said strip material therebetween, one of said rolls having a substantially smooth metallic outer surface for engaging the smooth side of said strips and the other having an elastomeric outer surface for engaging the corrugated surface thereof, a second pair of vertically disposed rolls arranged to receive said strip therebetween after said strip material has passed between said first pair of rolls, one of said second pair of rolls having cutting means disposed at predetermined staggered intervals about the periphery thereof arranged to be moved successively into engagement with the embossed surface of said strip, the other of said second pair of rolls being freely rotatable and having a substantially smooth metallic outer surface for engaging the smooth surface of said strip for vertically supporting said strip while the cutting means of said first roll severs the strip into individual pieces of material, and means for simultaneously driving both rolls of said first pair of rolls at the same speed of rotation and the roll carrying the cutting means at a predetermined speed of rotation relative to the rotation of said first pair of rolls for causing said pieces to have a predetermined length.

5. An apparatus for severing storage battery separators from a plurality of continuously moving parallel strips of relatively brittle material wherein one side of said strip is substantially smooth and the other side is provided with an embossed surface, comprising; a pair of vertically disposed rolls arranged for receiving said strip material therebetween, one of said rolls having a substantially smooth metallic outer surface for engaging the smooth side of said strips and the other having an elastomeric outer surface for engaging the embossed surface thereof and which deforms under pressure to the contour of the embossed surfaces, a second pair of vertically disposed rolls arranged to receive said strip therebetween after said strip material has passed between said first pair of rolls, one of said second pair of rolls having cutting means disposed at predetermined intervals about the periphery thereof arranged to be moved successively into engagement with the embossed surface of said strip, the other of said second pair of rolls being freely rotatable and having a substantially smooth metallic outer surface for engaging the smooth surface of said strip for vertically supporting said strip while the cutting means of said first roll severs the strip into individual pieces of material, and means for simultaneously driving both rolls of said first pair of rolls at the same speed of rotation and for driving the roll carrying the cutting means at a predetermined speed of rotation relative to the rotation of said first pair of rolls for causing said pieces to have a predetermined length and means for causing a different relative rotational speed between said first pair of rolls and the roll carrying the cutting means for changing the length of said severed pieces.

References Cited in the file of this patent

UNITED STATES PATENTS

| | | |
|---|---|---|
| Re. 22,123 | Egerton | June 23, 1942 |
| 797,886 | Deely | Aug. 22, 1905 |
| 1,006,783 | Paquin | Oct. 24, 1911 |
| 1,107,762 | Cumfer | Aug. 18, 1914 |
| 1,176,680 | Langston | Mar. 21, 1916 |
| 1,370,381 | Tarbox | Mar. 1, 1921 |